2,840,618

PRODUCTION OF ALKYNOLS AND ALKYNEDIOLS USING MULLITE-LIKE SILICEOUS CATALYST CARRIER

Otto Friedrich Hecht, Easton, Pa., assignor to General Aniline & Film Corporation, New York, N. Y., a corporation of Delaware No Drawing. Application December 30, 1954
Serial No. 478,883

10 Claims. (Cl. 260—635)

This invention relates to the provision of an improved catalyst for use in the production of alkynols including alkynediols by the reaction of a carbonyl compound selected from the group consisting of aldehydes and ketones with an acetylenic hydrocarbon containing an active hydrogen atom.

In my application Serial No. 318,083, now Patent No. 2,768,215, filed October 31, 1952, of which this application is a continuation-in-part, there is disclosed and claimed the production of an improved catalyst for use in the processes of U. S. Patent Nos. 2,232,867 and 2,300,969. Said improved catalyst is obtained by depositing copper oxide, and desirably bismuth oxide or similar compound disclosed in U. S. Patent No. 2,300,969 for preventing the formation of cuprene on a siliceous carrier and heating the thus impregnated siliceous carrier to a temperature within the range of 400 to 800° C. for such a period of time that copper (and bismuth) silicates are formed in the surface layer and the thus heat-treated catalyst, when treated with acetylene at room temperature, does not form red copper acetylide.

Said application disclosed as suitable siliceous carriers substances such as kaolin, silica gel, fuller's earth, etc. The instant invention is based upon the discovery that the best siliceous carrier for use in the invention disclosed and claimed in said copending application is a mullite-like material prepared by forming a mixture of kaolin and a water-soluble synthetic organic polymeric binder into a shaped body, roasting said shaped body at temperatures of about 800 to 850° C. in the presence of air to convert the kaolin into montmorillonite and burn out the said binder, and then subjecting said body to temperatures of about 1000 to 1200° C., preferably 1030 to 1100° C., to produce the desired mullite-like structure. The carrier thus obtained may then be impregnated with the copper and bismuth compounds, and subsequently treated in accordance with the process disclosed and claimed in said copending application.

The catalytic bodies obtained in accordance with the instant invention when employed for the production of alkynols including alkynediols as described above and in said copending application, have been found to have a much longer life-time and increased mechanical stability in addition to enabling the production of good yields of the desired products and minimum cuprene production.

As water-soluble synthetic organic polymeric binders which may be employed in the instant invention, there may be mentioned polyacrylic acid, alginic acid (polymannuronic acid), pectic acid (polygalacturonic acid), and especially polyvinyl methyl ether, and methyl cellulose, their water-soluble salts, and mixtures thereof. Such binders have been found to be superior to binders commonly employed in the catalytic art such as glucose, cane sugar, syrup, molasses, gelatin, starch paste, and the like, in being more easily burned out yielding a carrier having a higher porosity. The amount of binder to be mixed with the kaolin should be sufficient to yield a composition which, if desired after suitable drying, may be shaped in any desired manner, as for example, by stamping, extruding, molding, or otherwise. Preferably, the composition should be of a putty-like consistency when being shaped.

During the burning operation at temperatures of about 800 to 850° C. the synthetic organic binder is incinerated and burned out leaving fine pores in the ceramic material which thus has a large active surface. At this stage of the process, the shaped body is principally montmorillonite. The subsequent heating, roasting or burning step at temperatures of 1000 to 1200° C., while reducing the porosity and hence the amount of active surface of the carrier, yields a product which has high mechanical strength, resistance to attrition, and the like.

The resulting mullite-like carrier is then employed as the siliceous carrier in the process of said copending application, which broadly comprises impregnating the carrier with the copper (and bismuth) compounds and heating at 400 to 800° C. for a sufficient period of time to obtain the desired topochemical reaction resulting in the formation of copper (and bismuth) silicates in the surface layer.

The following example, in which parts are by weight unless otherwise indicated, is illustrative of the instant invention and is not to be regarded as limitative.

*Example*

1000 parts of kaolin ($Al_2O_3 \cdot 2SiO_2 \cdot 2H_2O$) are mixed with 500 parts of a 30% aqueous solution of a polyvinyl methyl ether (spec. viscosity:0.54 in 1% benzene solution at 25° C.) to the consistency of putty. This mixture is then pressed through an extrusion press with holes of about 4 mm. diameter and cut into pieces of 5 to 6 mm. in length.

The bodies so formed are now dried at 80° C. to 90° C. in an oven for removal of the water and then roasted for five hours at 800° C. to 850° C., whereby the kaolin is transformed through the metakaolin stage ($Al_2O_3 \cdot 2SiO_2$) to montmorillonite ($Al_2O_3 \cdot 4SiO_2$) in the presence of air, so that the polyvinyl methyl ether may completely be burned out. This montmorillonite is now roasted for one hour at 1080° C. in an electric oven and results in a "semi-mullite" status. (According to the X-ray pattern, this material is already mullite [$3Al_2O_3 \cdot 2SiO_2$] concerning its structure. However, the mechanical strength is between montmorillonite and mullite.)

After a slow cooling procedure to room temperature, 1000 parts of these ceramic bodies are soaked with a solution of 387 parts copper nitrite trihydrate and 180 parts bismuth nitrate pentahydrate, dissolved in a mixture of 334 parts of nitric acid (70%) and 250 parts of water.

This product is now slowly dried by vaporization of water and acid for 42 hours at 80° C. and then fired and roasted for 36 hours at 500° C.

1215 parts of catalyst are finally obtained, which is after reduction (by refluxing with 12% neutralized formaldehyde solution for 30 minutes) and generation with acetylene ready for use in the alkynol synthesis.

This invention has been disclosed with respect to certain preferred embodiments, and various modifications and variations thereof will become obvious to the person skilled in the art. It is to be understood that such modifications and variations are to be included within the spirit and purview of this application, and the scope of the appended claims.

I claim:

1. In a method of producing a catalyst for use in the production of alkynols by reacting a carbonyl compound with acetylene hydrocarbons, which method comprises depositing copper oxide on a siliceous carrier and heating the thus impregnated siliceous carrier to a temperature within the range of 400 to 800° C. for such a period of time that copper silicate is formed in the surface layer and the thus heat-treated catalyst when treated with acetylene at room temperature, does not form red copper acetylide the improvement which comprises employing therein a siliceous carrier prepared by forming a mixture consisting essentially of kaolin and a water-soluble synthetic organic polymeric binder into a shaped body, heating said body in the presence of air at temperatures of about 800 to 850° C. to burn out said binder and convert the kaolin to the montmorillonite, and then heating said body to temperatures of about 1000 to 1200° C. to produce a porous, mullite-like siliceous carrier having a mullite X-ray pattern.

2. A siliceous carrier prepared as defined in claim 1.

3. A catalyst prepared as defined in claim 1.

4. In a process for the production of alkynols by reaction of a carbonyl compound selected from the class consisting of aldehydes and ketones with acetylene hydrocarbons in the liquid phase in the presence of a catalyst, the improvement which comprises employing as such catalyst a catalyst as defined in claim 3.

5. A method as defined in claim 1 wherein said binder is polyvinyl methyl ether.

6. A siliceous carrier prepared as defined in claim 5.

7. A catalyst prepared as defined in claim 5.

8. In a process for the production of alkynols by reaction of a carbonyl compound selected from the class consisting of aldehydes and ketones with acetylene hydrocarbons in the liquid phase in the presence of a catalyst, the improvement which comprises employing as such catalyst a catalyst as defined in claim 7.

9. A method for producing a siliceous carrier for a catalyst comprising forming a mixture consisting essentially of kaolin and a water-soluble synthetic organic polymeric binder into a shaped body, heating said body in the presence of air at temperatures of about 800 to 850° C. to burn out said binder and convert the kaolin to montmorillonite, and then heating said body to temperatures of about 1000 to 1200° C. to produce a porous mullite-like siliceous carrier having a mullite X-ray pattern.

10. A method as defined in claim 9 wherein said binder is polyvinyl methyl ether.

References Cited in the file of this patent
UNITED STATES PATENTS

| 2,300,969 | Reppe et al. | Nov. 3, 1942 |
| 2,633,623 | Robinson | Apr. 7, 1953 |
| 2,697,066 | Sieg | Dec. 14, 1954 |

OTHER REFERENCES

Grant: Hackh's Chemical Dictionary, 3d edition (1944), The Blakiston Co., Philadelphia, page 552.